(12) United States Patent
Kaul et al.

(10) Patent No.: US 6,512,115 B2
(45) Date of Patent: Jan. 28, 2003

(54) PREPARATION OF PIGMENTS

(75) Inventors: Bansi Lal Kaul, Biel Benken (CH);
Bruno Piastra, Huningue (FR); Pascal Steffanut, Colmar (FR)

(73) Assignee: Clariant Finance (BVI) Limited, Tortola (VI)

( * ) Notice: Subject to any disclaimer, the term of this patent is extended or adjusted under 35 U.S.C. 154(b) by 0 days.

(21) Appl. No.: 09/800,038

(22) Filed: Mar. 6, 2001

(65) Prior Publication Data

US 2001/0031864 A1 Oct. 18, 2001

(30) Foreign Application Priority Data

Mar. 6, 2000 (CH) ................................. 0430/00

(51) Int. Cl.⁷ ..................... C07D 498/14; C07D 498/22
(52) U.S. Cl. ................. 544/74; 544/73; 8/506
(58) Field of Search ........................ 544/74, 73; 8/506

(56) References Cited

U.S. PATENT DOCUMENTS

| | | | |
|---|---|---|---|
| 5,122,605 A | 6/1992 | Pedrazzi | 544/76 |
| 5,565,563 A | 10/1996 | Kaul et al. | 544/74 |
| 6,162,261 A | 12/2000 | Kempter et al. | 8/506 |
| 6,214,989 B1 | 4/2001 | Kaul et al. | 544/74 |
| 6,255,482 B1 | 7/2001 | Boeglin et al. | 544/74 |
| 6,302,923 B1 | 10/2001 | Hasemann | 8/445 |
| 6,319,289 B1 | 11/2001 | Schofberger | 8/543 |
| 6,355,795 B1 | 3/2002 | Boeglin et al. | 544/74 |
| 6,359,131 B1 | 3/2002 | Nagl et al. | 544/74 |

FOREIGN PATENT DOCUMENTS

| | | | |
|---|---|---|---|
| EP | 0 889 046 | | 1/1999 |
| EP | 911337 | * | 4/1999 |

OTHER PUBLICATIONS

U.S. Ser. No. 09/780,204, filed Feb. 9, 2001, Kaul, et al.
J.F. Hughes, "Electostatics Powder Coating", Research Studies, John Wiley & Sons, 1984.
L.B. Schein, "Electrophotography and Development Physics", Springer Series in Electophysics 14, Springer Verlag, 2nd Edition, 1992.
Thiele Reaction:"Formation of triacetoxy aromatic compounds";J. Thiele, Ber. 31, 1247 (1898).*

* cited by examiner

Primary Examiner—Richard L. Raymond
Assistant Examiner—Sudhaker B. Patel
(74) Attorney, Agent, or Firm—Anthony A. Bisulca

(57) ABSTRACT

The invention relates to a process for preparing triphendioxazine compounds by cyclizing the intermediates (IV)

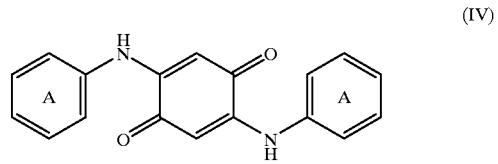

(IV)

in the presence of manganese oxide and sulfuric acid to form compounds of the general formula (I)

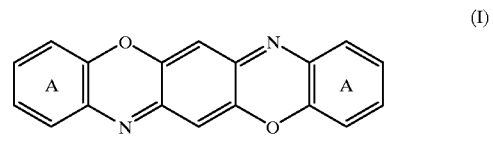

(I)

a process for condensing compounds of the general formula (II)

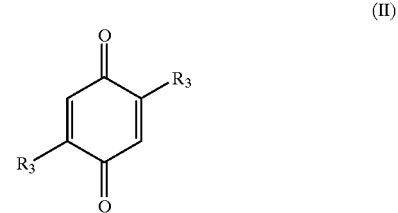

(II)

with compounds of the general formula (III) to form the chlorine-free intermediates (IV)

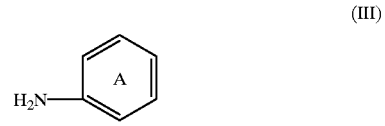

(III)

and also compounds of the general formula (IV).

11 Claims, No Drawings

PREPARATION OF PIGMENTS

FIELD OF THE INVENTION

This invention provides a particularly advantageous process for preparing triphendioxazine compounds and particularly advantageous intermediates.

BACKGROUND OF THE INVENTION

European patent application EP 0889046 A1 describes symmetrically disubstituted triphendioxazine compounds of the following general formula (I)

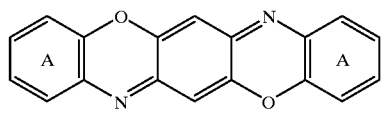

(I)

where the rings marked A are inter alia linearly fused in positions 2, 3 and 9, 10 with rings having complementary members including of the formulae $-NR_1-(CO)_m-NH-$ and $-NR_1-(CO)_m-O-$; where $R_1$ is hydrogen, $C_{1-4}$alkyl or phenyl, preferably hydrogen, methyl or ethyl; and m is 1 or 2.

The preparative process disclosed in EP 0889046 A1 proceeds from intermediates, i.e. amino compounds, which are ortho-substituted by an alkoxy group and obtainable only by a relatively complex synthesis. The process described is characterized by the use of 2,3,5,6-tetrachloro-1,4-benzoquinone and leads to intermediates which are chlorinated on the central ring. The ring closure reaction proceeds by dechlorination and leads to the chlorine-free triphendioxazine compounds of the general formula (I). The condensation reaction does not generally lead completely to the chlorine-free compounds of the formula (I); it virtually always by-produces a certain amount of monochloro and dichloro compounds.

SUMMARY OF THE INVENTION

It is an object of the present invention to provide a process which proceeds from readily available intermediates that are not chlorinated on the central ring and leads via nonchlorinated intermediates to the desired triphendioxazine compounds which are completely chlorine-free on the central ring.

DESCRIPTION OF THE PREFERRED EMBODIMENTS

It was surprisingly determined that even amino compounds which are not substituted in the ortho position are useful as intermediates, provided the cyclization taking place following the reaction with a benzoquinone is carried out according to the invention using manganese dioxide and 80 to 100% strength, preferably 90 to 95% strength, sulfuric acid. It is also unexpected that the cyclization is not accompanied by a sulfonation on the central ring, but provides the triphendioxazine compounds of the general formula (I) directly.

The reaction of 1 mol of a compound of the general formula (II)

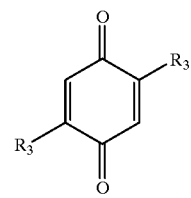

(II)

where $R_3$ is hydrogen, $C_{1-10}$alkoxy, halogen or hydroxyl, with 2 mol of a compound of the general formula (III) (=intermediates)

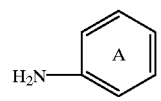

(III)

where the ring marked A is linearly fused in position 3, 4 with a ring having a complementary member of the formula $-NR_1(CO)_m-NR_2$ or $-O-CO-NR_2$; m is 1 or 2; and $R_1$ and/or $R_2$ are each independently hydrogen, a $C_{1-8}$alkyl radical, a substituted or unsubstituted phenyl, benzyl, naphthyl or benzanilide radical, a substituted or unsubstituted $C_{5-6}$cycloalkyl radical or a radical of the formula is followed as a characterizing step by a cyclization carried out using manganese dioxide($MnO_2$) and 80 to 100% strength, preferably 90 to 95% strength, sulfuric acid.

Preferred compounds of the general formula (III) are (IIIa)

(IIIb)

(IIIc)

(IIId)

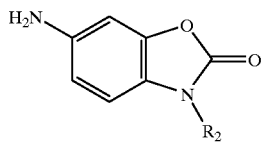

where $R_1$ and $R_2$ are each as defined above.

The condensation reaction of compound (II) with compound (III) or (IIIa–d) is carried out in a solvent in the presence of an inorganic or organic acid as a catalyst between 50 and 160° C. It may also be carried out in water or glacial acetic acid. The condensation reaction leads to intermediates of the general formula (IV), where the rings marked A are defined as above for formula (III).

(IV)

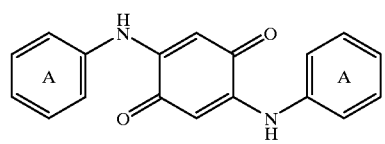

The advantage of this process is that it is possible to proceed from the intermediates (III) or (IIIa), (IIIb), (IIIc) and (IIId) which, unlike the amino compounds bearing an alkoxy group in the ortho position, are relatively simple to obtain. Starting compound (II) is preferably 2,5-dihydroxy-1,4-benzoquinone.

Preferred solvents for the condensation reaction are high-boiling solvents such as, for example, N-methylpyrrolidone, dimethylformamide or orthodichlorobenzene.

The preparation of the intermediates (IIIa), (IIIb), (IIIc) and (IIId) is described in EP 0911337 A1.

Preferably $R_1$ and $R_2$ are each independently hydrogen, methyl, ethyl, n-propyl, isopropyl, n-butyl, isobutyl, sec-butyl, tert-butyl, cyclohexyl, a substituted or unsubstituted benzanilide radical, naphthyl, a radical of the formula

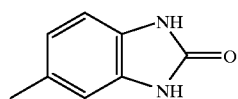

an unsubstituted phenyl radical or a phenyl radical which is substituted by one or more substituents selected from the group consisting of halogen, preferably chlorine, nitro, phenyl, $C_{1-8}$-alkyl, preferably $C_{1-4}$-alkyl, and $C_{1-2}$-alkoxy.

The abovementioned substituted phenyl radical in the definition of $R_1$ and $R_2$ is preferably a radical of the formulae (a) to (q)

(a)

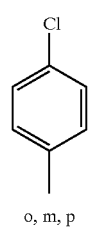

o, m, p (b)

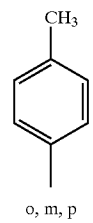

o, m, p (c)

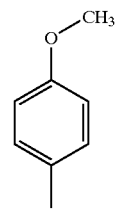

o, m, p (d)

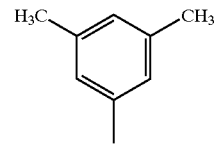

(e)

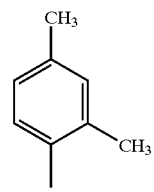

(f)

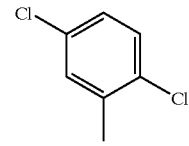

(g)

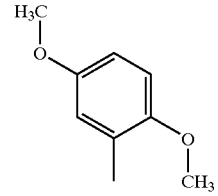

(h)

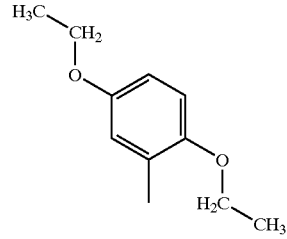

-continued
(i) 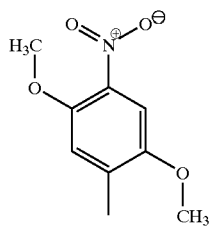
(j) 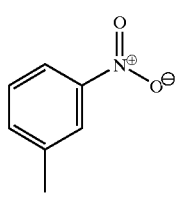
(k) 
(l) 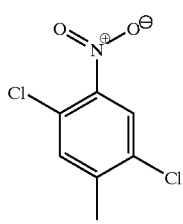
(m) 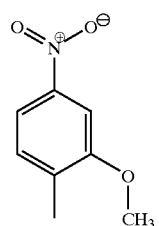
(n) 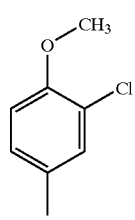
(o) 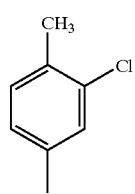
-continued
(p) 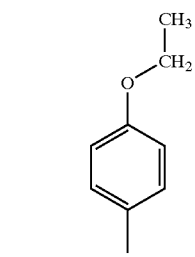
(q) 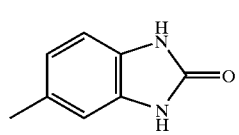
The abovementioned substituted benzanilide radical in the definition of $R_1$ and $R_2$ is preferably a radical of the formulae (r) and (s)
(r) 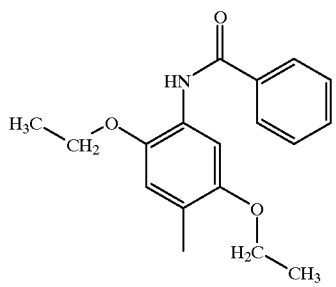
(s) 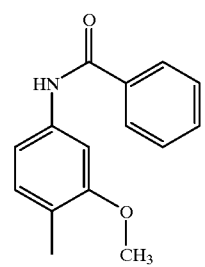
Particularly preferred compounds of the formula (III) are compounds conforming to the following formulae (1) to (18):
(1) 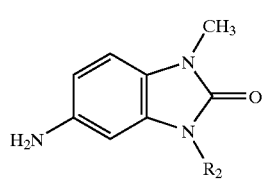
(2) 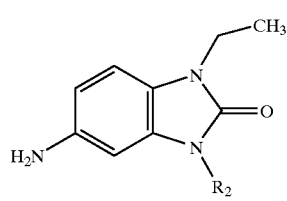

-continued
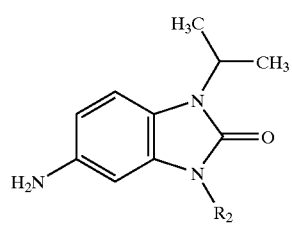
(3)
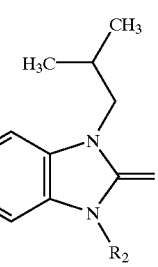
(4)
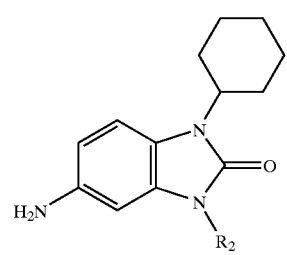
(5)
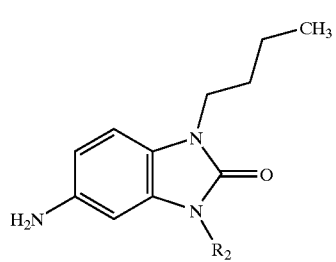
(6)
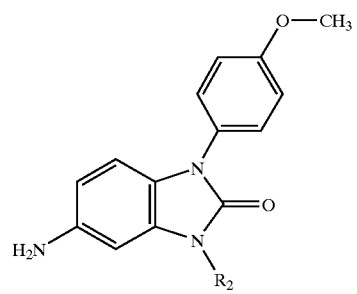
(7)
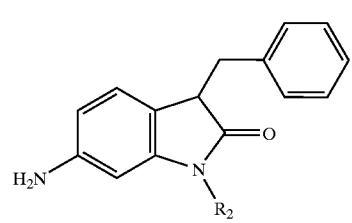
(8)
-continued
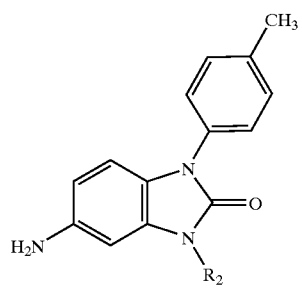
(9)
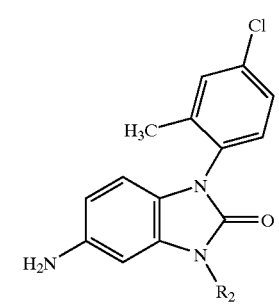
(10)
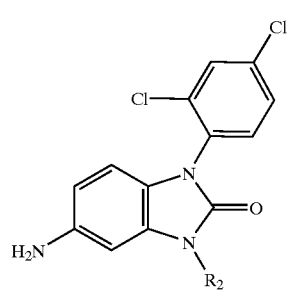
(11)
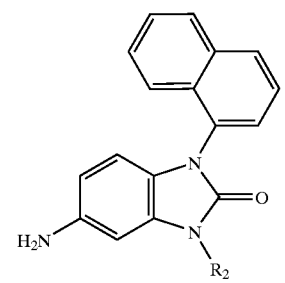
(12)
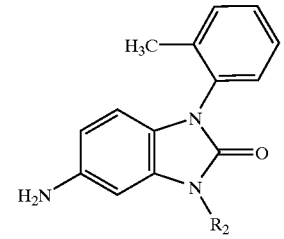
(13)

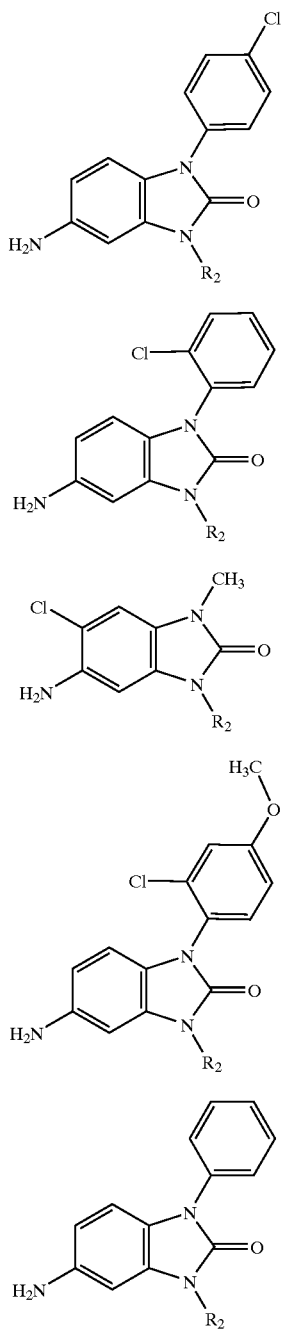

Triphendioxazine compounds of the formula (I) which are prepared by the process according to the invention are used as pigments.

The pigments prepared according to the process of the invention are very useful for coloring plastic materials, by which are meant solvent-free and solvent-containing materials comprising plastics or synthetic resins (in oil-based or water-based paints, in coating materials of various kinds, for spin dyeing viscose or cellulose acetate or for pigmenting plastics, for example polyamide, polyethylene, polystyrene, polyvinyl chloride, rubber and artificial leather). They may also be used in printing inks for the graphical industry, for the coloring of paper materials, for the coating of textiles or for pigment printing.

They may also be used in cosmetics.

The colorations obtained are notable for their excellent heat, light and weather fastness, chemical resistance, color strength and very good application properties, for example crystallization resistance and dispersing fastness, and especially for their fastness to migration, bleeding, overcoating and solvents.

In addition, the pigments prepared according to the process of the invention are also useful as colorants in electrophotographic toners and developers, for example one- or two-component powder toners (also known as one- or two-component developers), magnetic toners, liquid toners, polymerization toners and further specialty toners (ref.: L. B. Schein, "Electrophotography and Development Physics"; Springer Series in Electrophysics 14, Springer Verlag, $2^{nd}$ edition, 1992).

Typical toner binders include addition polymerization, polyaddition and polycondensation resins, such as styrene, styrene acrylate, styrene butadiene, acrylate, polyester, phenolic and epoxy resins, polysulfones, polyurethanes, individually or in combination, and also polyethylene and polypropylene, in or to which further ingredients, such as charge control agents, waxes or flow auxiliaries, may be present or added subsequently.

A further application area for pigments prepared according to the process of the invention is their use as colorants in powders and powder coating materials, especially triboelectrically or electrokinetically sprayed powder coating materials, which are used to coat the surfaces of articles made, for example, of metal, wood, plastic, glass, ceramic, concrete, textile material, paper or rubber (J. F. Hughes, "Electrostatics Powder Coating", Research Studies Press, John Wiley & Sons, 1984).

Powder coating resins employed are typically epoxy resins, carboxyl- and hydroxyl-containing polyester resins, polyurethane resins and acrylic resins together with customary curing agents. Combinations of resins are also used. For instance, epoxy resins are frequently used in combination with carboxyl- and hydroxyl-containing polyester resins. Typical curing agent components (depending on the resins system) are, for example, acid anhydrides, imidazoles and dicyandiamide and derivatives thereof, blocked isocyanates, bisacylurethanes, phenolic and melamine resins, triglycidyl isocyanurates, oxazolines and dicarboxylic acids.

The pigments prepared according to the process of the invention are also useful as colorants in inkjet inks, both aqueous and nonaqueous, and in those inks which operate according to the hot-melt process.

EXAMPLES

In the examples which follow, parts and percentages are by weight. The temperatures are reported in degrees Celsius. One part by volume corresponds to the volume of one part by weight of water.

Example 1

3,11-Di-p-tolyldiimidazo(4,5-b:4',5'-m) triphendioxazine-2,10-dione 120 parts of 1-(p-tolyl)-1,3-dihydro-5-aminobenzimidazol-2-one and 35 parts of 2,5-dihydroxy-1,4-benzoquinone are introduced into 500 parts by volume of glacial acetic acid. The stirred mixture is heated to 110° C., is cooled and the crystallized intermediate is filtered off, washed with 250 parts of glacial acetic acid and then with 500 parts of water and dried.

Microanalysis: calc. C 70.09 H 4.5 N 14.42 O 10.98%; found C 69.9 H 4.4 N 14.4 O 11.1%.

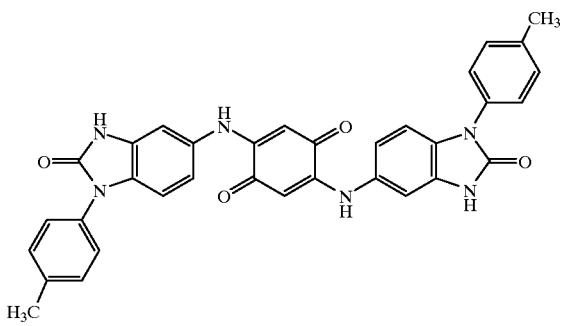

81 parts of this intermediate are introduced into 400 parts of H$_2$SO$_4$ (90%) with ice cooling. 29.6 parts of MnO$_2$ (88%) are then added over 3 hours and the mixture is warmed to room temperature over 24 hours. 63 parts of water are added to dilute the condensation mixture to 80% and it is then admixed with 5.1 parts of H$_2$O$_2$ with cooling. The pigment obtained is filtered off and washed with 300 parts of 80% H$_2$SO$_4$, then with 300 parts of 50% H$_2$SO$_4$ and acid-free with 4000 parts of water. The moist pressed cake is then suspended in 500 parts of dimethylacetamide and the remaining water is distilled off at 100–150° C. After cooling to 120° C. the pigment is filtered, then washed with 800 parts of hot dimethylacetamide at 120° C. and then with 400 parts of water and dried at 80° C. under reduced pressure to obtain 60 parts of a pigment of the above formula, which colors plastics in reddish violet shades possessing excellent migration fastness.

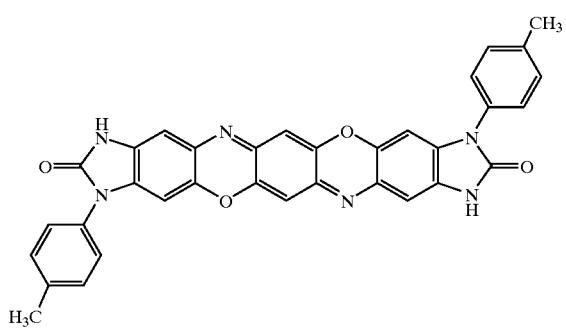

NMR $_1$H (360 MHz, D6-DMSO): 2.4 (s, 6H, CH3), 6.3 (s, 2H, aromatic CH), 6.5 (s, 2H, aromatic CH), 6.7 (s, 2H, aromatic CH), 7.3 (dd, 8H, tolyl CH).

Microanalysis: calc. C 70.58 H 3.83 N 14.52%; found C 69.2 H 4.0 N 14.6%.

Example 2

3,11-Dimethyldiimidazo(4,5-b:4',5'-m) triphendioxazine-2,10-dione 75 parts of 1-methyl-1,3-dihydro-5-aminobenzimidazol-2-one and 35 parts of 2,5-dihydroxy-1,4-benzoquinone are introduced into 400 parts by volume of glacial acetic acid. The stirred mixture is heated to the boil and cooled and the crystallized intermediate is filtered off, washed with 200 parts of glacial acetic acid and then with water and dried.

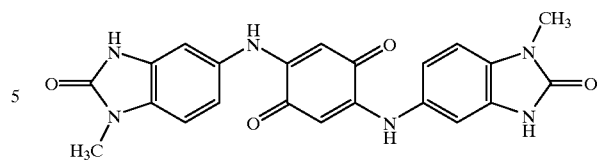

50 parts of this intermediate are introduced into 500 parts of H$_2$SO$_4$ (95%) with ice cooling. 13 parts of MnO$_2$ are then added over 3 hours and the mixture is warmed to room temperature over 24 hours. 94 parts of water are added to dilute the condensation mixture to 80% and it is then admixed with 3.6 parts of H$_2$O$_2$ with cooling. The pigment obtained is filtered off and washed with 600 parts of 80% H$_2$SO$_4$, then with 300 parts of 50% H$_2$SO$_4$ and acid-free with 4000 parts of water. The moist pressed cake is then suspended in 500 parts of dimethylacetamide and the remaining water is distilled off at 100–150° C. After cooling to 120° C. the pigment is filtered, then washed with 800 parts of hot dimethylacetamide at 120° C. and then with 400 parts of water and dried at 80° C. under reduced pressure.

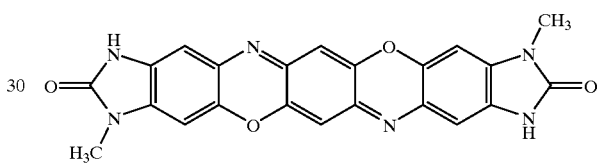

The resultant pigment of the above formula colors plastics in reddish violet shades having excellent migration and solvent fastness.

Example 3

3,11-Diphenyldiimidazo(4,5-b:4',5'-m) triphendioxazine-2,10-dione 128 parts of 1-(phenyl)-1,3-dihydro-5-aminobenzimidazol-2-one and 35 parts of 2,5-dihydroxy-1,4-benzoquinone are introduced into 400 parts by volume of glacial acetic acid.

The stirred mixture is heated to 110° C. and cooled and the crystallized intermediate is filtered off, washed with 300 parts of glacial acetic acid and then with 500 parts of water and dried.

NMR $^1$H (360 MHz, D$_6$-DMSO): 5.8 (s, 2H, CH quinone), 7.15 (s, 4H, aromatic CH), 7.25 (s, 2H, aromatic CH), 7.5 (m, 2H, aromatic CH), 7.7 (m, 8H, aromatic CH), 9.3 (s, 2H, NH), 11.2 (s, 2H, NH).

Microanalysis: calc. C 69.3 H 4.0 N 15.15 O 11.54%; found C 68.4 H 3.9 N 15.5 O 11.7%.

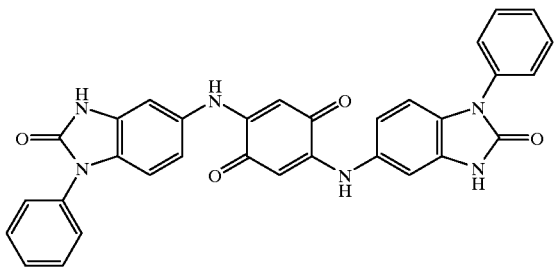

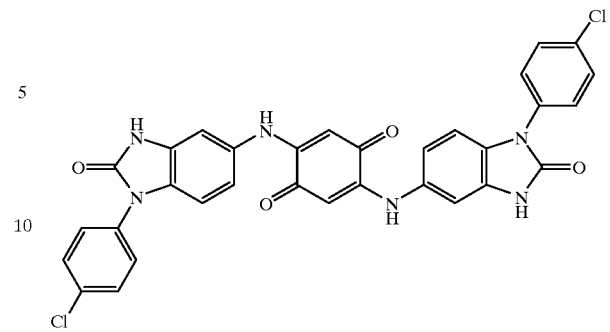

86 parts of this intermediate are introduced into 500 parts of $H_2SO_4$ (90%) with ice cooling. 29.6 parts of $MnO_2$ (88%) are then added over 3 hours and the mixture is warmed to room temperature over 24 hours. 63 parts of water are added to dilute the condensation mixture to 80% and it is then admixed with 5.1 parts of $H_2O_2$ with cooling. The pigment obtained is filtered off and washed with 300 parts of 80% $H_2SO_4$, then with 300 parts of 50% $H_2SO_4$ and acid-free with 4000 parts of water. The moist pressed cake is then suspended in 500 parts of dimethylacetamide and the remaining water is distilled off at 100–150° C. After cooling to 120° C. the pigment is filtered, then washed with 800 parts of hot dimethylacetamide at 120° C. and then with 400 parts of water and dried at 80° C. under reduced pressure to obtain 60 parts of a pigment of the above formula, which colors plastics in violet shades possessing excellent migration fastness.

86 parts of this intermediate are introduced into 500 parts of $H_2SO_4$ (90%) with ice cooling. 29.6 parts of $MnO_2$ (88%) are then added over 3 hours and the mixture is warmed to room temperature over 24 hours. 63 parts of water are added to dilute the condensation mixture to 80% and it is then admixed with 5.1 parts of $H_2O_2$ with cooling. The pigment obtained is filtered off and washed with 300 parts of 80% $H_2SO_4$, then with 300 parts of 50% $H_2SO_4$ and acid-free with 4000 parts of water. The moist pressed cake is then suspended in 500 parts of dimethylacetamide and the remaining water is distilled off at 100–150° C. After cooling to 120° C. the pigment is filtered, then washed with 800 parts of hot dimethylacetamide at 120° C. and then with 400 parts of water and dried at 80° C. under reduced pressure to obtain 60 parts of a pigment of the above formula, which colors plastics in reddish violet shades possessing excellent migration fastness.

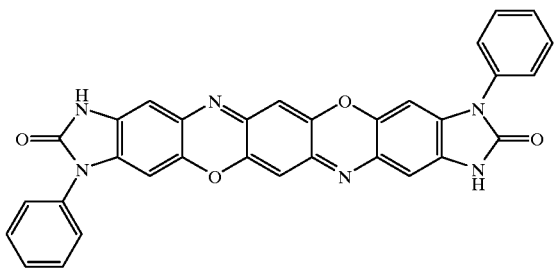

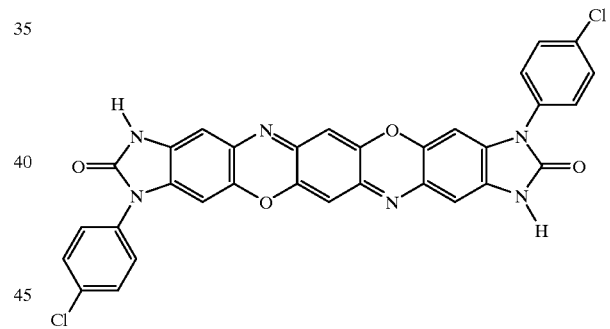

NMR $^1H$ (360 MHz, $D_6$-DMSO): 6.3 (s, 2H, aromatic CH), 6.6 (s, 2H, aromatic CH), 6.75 (s, 2H, aromatic CH), 7.3 (m, 2H, phenyl CH), 7.5 (m, 8H, phenyl CH), Microanalysis. C 69.8 H 3.3 N 15.27 O 11.62%; Found C 67.3 H 3.4 N 15.2 O 12.3%.

Example 4

3,11-Di-(P-chlorophenyl)-diimidazo(4,5-b:4',5'-m)triphendioxazine-2,10-dione 145 parts of 1-(p-chlorophenyl)-1,3-dihydro-5-aminobenzimidazol-2-one and 35 parts of 2,5-dihydroxy-1,4-benzoquinone are introduced into 400 parts by volume of glacial acetic acid. The stirred mixture is heated to 110° C. and cooled and the crystallized intermediate is filtered off, washed with 300 parts of glacial acetic acid and then with 500 parts of water and dried.

NMR $^1H$ (360 MHz, $D_6$-DMSO): 6.3 (s, 2H, aromatic CH), 6.6 (s, 2H, aromatic CH), 6.8 (s, 2H, aromatic CH), 7.5 (dd, 8H, phenyl CH). μA: calc.: C 62.05 H 2.6 N 13.57%; found: C 61.9 H 2.9 N 13.3%.

Example 5

3,11-Diethyldiimidazo(4,5-b:4',5'-m)triphendioxazine-2,10-dione 75 parts of 1-ethyl-5-aminobenzimidazol-2-one and 35 parts of 2,5-dihydroxy-1,4-benzoquinone are introduced into 400 parts by volume of glacial acetic acid. The stirred mixture is heated to 110° C. and cooled and the crystallized intermediate is filtered off, washed with 200 parts of glacial acetic acid and then with water and dried.

Or:

75 parts of 1-ethyl-5-aminobenzimidazol-2-one and 45 parts of 2,5-dimethoxy-1,4-benzoquinone are introduced into 400 parts by volume of glacial acetic acid. The stirred mixture is heated to 110° C. and cooled and the crystallized intermediate is filtered off, washed with 200 parts of glacial acetic acid and then with water and dried.

Or:

75 parts of 1-ethyl-5-aminobenzimidazol-2-one are introduced into 400 parts by volume of 10% concentrated hydrochloric acid and 81 parts of 1,4-benzoquinone are subsequently added over 2 hours. The stirred mixture is heated to 110° C. and cooled and the crystallized intermediate is filtered off, washed with 800 parts of warm 10% concentrated hydrochloric acid then with warm water and dried.

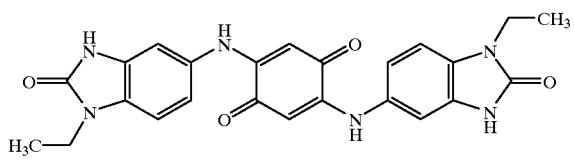

50 parts of this intermediate are introduced into 300 parts of $H_2SO_4$ (95%) with ice cooling. 13 parts of $MnO_2$ are then added over 3 hours and the mixture is warmed to room temperature over 24 hours. 94 parts of water are added to dilute the condensation mixture to 80% and it is then admixed with 3.6 parts of $H_2O_2$ with cooling. The pigment obtained is filtered off and washed with 600 parts of 80% $H_2SO_4$, then with 300 parts of 50% $H_2SO_4$ and acid-free with 4000 parts of water. The moist pressed cake is then suspended in 500 parts of dimethylacetamide and the remaining water is distilled off at 100–150° C. After cooling to 120° C. the pigment is filtered, then washed with 800 parts of hot dimethylacetamide at 120° C. and then with 400 parts of water and dried at 80° C. under reduced pressure.

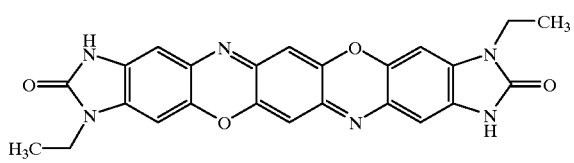

NMR $^1$H (360 MHz, D6-DMSO): 1.11 (t, 6H, $CH_3$), 3.71 (q, 4H, $CH_2$), 6.25 (s, 2H, aromatic CH), 6.5 (s, 2H, aromatic CH), 6.6 (s, 2H, aromatic CH).

Microanalysis. C 63.4 H 4.0 N 18.5 O 14.1%; Found C 62.5 H 3.7 N 18.8 O 14.1%.

The resultant pigment of the above formula colors plastics in reddish blue shades having excellent migration and solvent fastness.

What is claimed is:

1. A process for preparing symmetrically disubstituted triphendioxazine compounds, which comprises cyclizing a compound of the formula (IV)

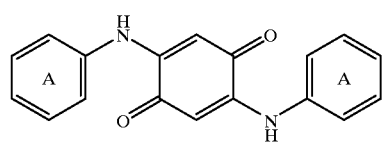

(IV)

where the rings marked A are each linearly fused in position 3, 4 with a ring having a complementary member of the formula —$NR_1(CO)_m$—$NR_2$; m is 1 or 2; and $R_1$ and/or $R_2$ are each independently hydrogen, a $C_{1-8}$alkyl radical, a substituted or unsubstituted phenyl, benzyl, naphthyl or benzanilide radical, a substituted or unsubstituted $C_{5-6}$cycloalkyl radical or a radical of the formula

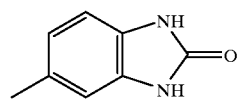

in the presence of manganese dioxide and 80 to 100% strength sulfuric acid.

2. A process for preparing a compound of the formula (IV)

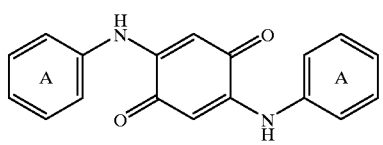

(IV)

which comprises condensing one mole of the compound of the formula (II)

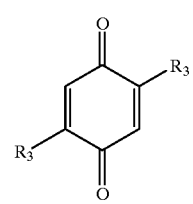

(II)

where $R_3$ is hydrogen, $C_{1-10}$alkoxy, halogen or hydroxyl, with two moles of a compound of the general formula (III)

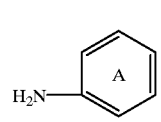

(III)

where A is as defined in claim 1.

3. A process according to claim 2, wherein one mole of the compound of the formula (II) is condensed with 2 mol of a compound of general formulae (IIIa) to (IIId)

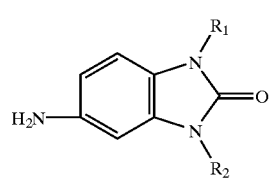

(IIIa)

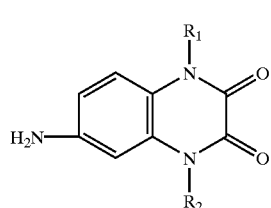

(IIIb)

where $R_1$ and $R_2$ are each as defined in claim 1.

4. A process according to claim 2, wherein $R_3$ is hydroxyl.

5. A process according to claim 2, wherein said condensing is effected in the presence of an inorganic or organic acid at temperatures between 50 and 160° C.

6. A compound of the general formula (IV)

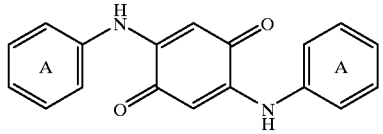
(IV)

where the rings marked A are each linearly fused in position 3, 4 with a ring having a complementary member of the formula —NR$_1$(CO)$_m$—NR$_2$; m is 1 or 2; and $R_1$ and/or $R_2$ are each independently hydrogen, a $C_{1-8}$alkyl radical, a substituted or unsubstituted phenyl, benzyl, naphthyl or benzanilide radical, a substituted or unsubstituted $C_{5-6}$cycloalkyl radical or a radical of the formula

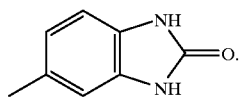

7. A compound according to claim 6 of the formula (IV), wherein $R_1$ and $R_2$ are each independently hydrogen, methyl, ethyl, n-propyl, isopropyl, n-butyl, isobutyl, sec-butyl, tert-butyl, cyclohexyl, a substituted or unsubstituted benzanilide radical, naphthyl, a radical of the formula

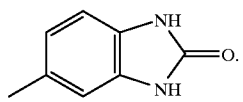

an unsubstituted phenyl radical or a phenyl radical which is substituted by one or more substituents selected from the group consisting of halogen, preferably chlorine, nitro, phenyl, $C_{1-8}$-alkyl, preferably $C_{1-4}$-alkyl, and $C_{1-2}$-alkoxy.

8. A compound according to claim 7 of the formula (IV), wherein the substituted phenyl radical in $R_1$ and $R_2$ is a radical of the formulae (a) to (q)

(a)
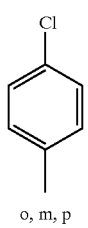
o, m, p (b)
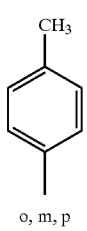
o, m, p (c)
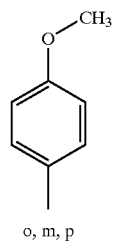
o, m, p (d)

(e)
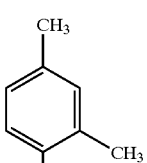

(f)
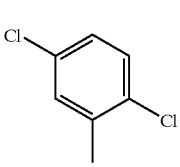

(g)
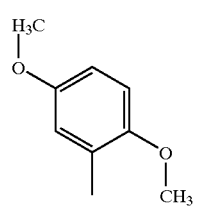

(h)
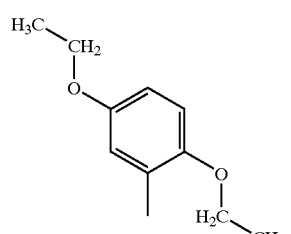

(i)
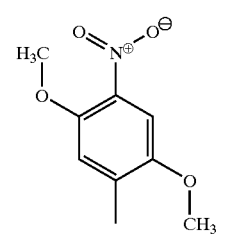

(j)
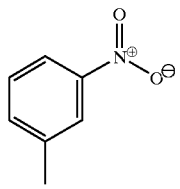

-continued
(k) 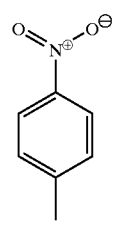
(l) 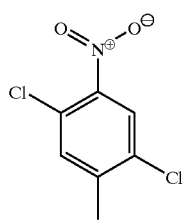
(m) 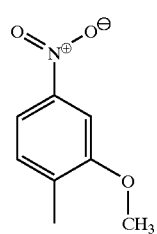
(n) 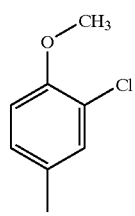
(o) 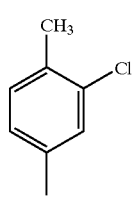
(p) 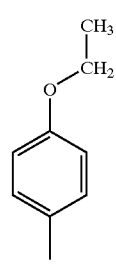
-continued
(q) 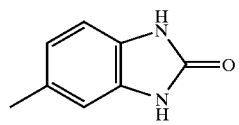
or the substituted benzanilide radical $R_1$ and $R_2$ is a radical of the formulae (r) and (s)
(r) 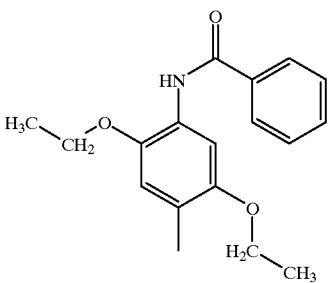
(s) 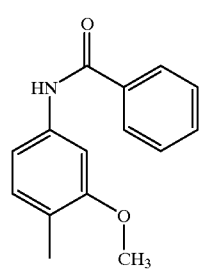
9. A compound of the formula (I):
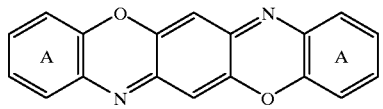 (I)
prepared by the process of claim 1, wherein the rings marked A are defined as in claim 1.
10. A colorant comprising the compound of claim 9.
11. A pigment comprising the compound of claim 9.
* * * * *